June 3, 1941.  P. STORM  2,244,377
MEASURING INSTRUMENT
Filed Jan. 15, 1941
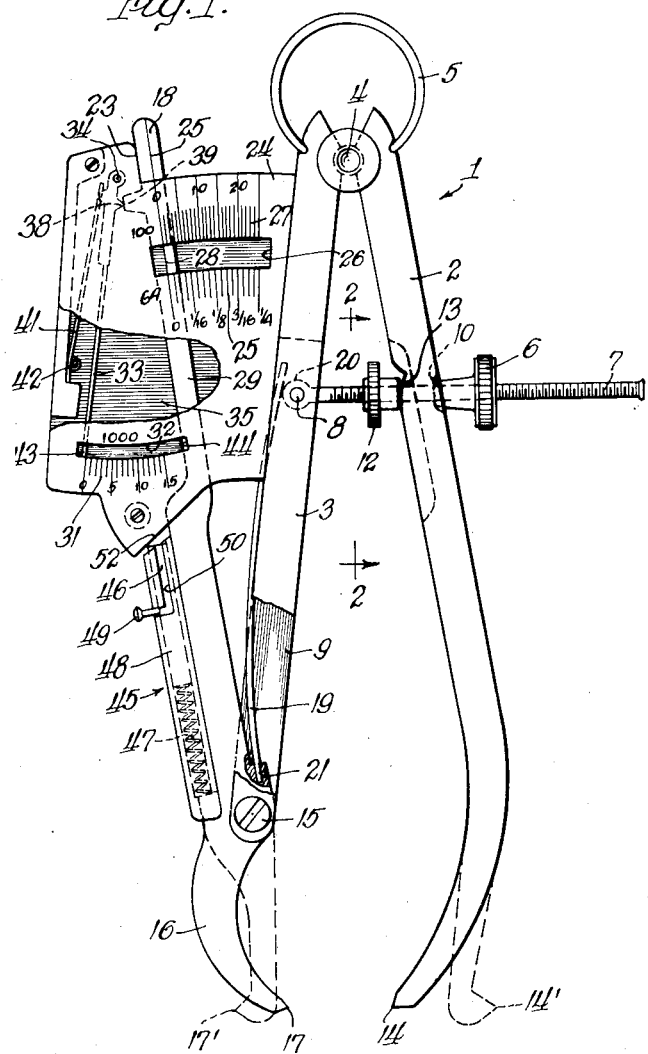
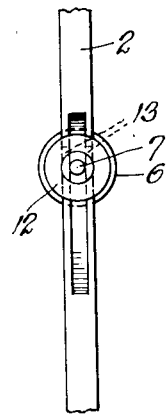
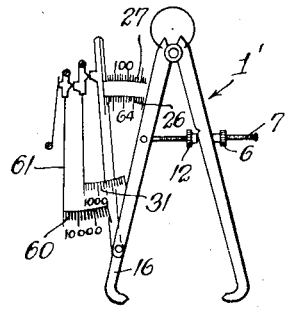
INVENTOR.
Peter Storm Patented June 3, 1941

2,244,377

UNITED STATES PATENT OFFICE 2,244,377

MEASURING INSTRUMENT

Peter Storm, Chicago, Ill.

Application January 15, 1941, Serial No. 374,525

3 Claims. (Cl. 33—148)

The present invention relates to precision measuring instruments and is concerned more particularly with new and useful improvements in measuring and indicating calipers of the type described in my copending application, Serial No. 291,849, filed August 25, 1939.

The principal object of the invention is to provide a caliper with a plurality of greatly enlarged scales of different fractional subdivisions permitting of a very accurate determination of the measurements or deviations from the desired measurements of a workpiece. Since the different scales of the calipers embodying the present invention indicate successively smaller fractional subdivisions, a machine operator may begin the machining of the work piece with a rough cut after determining by means of the large fraction scale, $\frac{1}{64}$ of an inch for instance. As the work piece approaches the ultimately desired measurement, the operator will determine the successively smaller deviations from this measurement upon the scales indicating the finer fractional subdivisions, $\frac{1}{100}$, $\frac{1}{1000}$ or $\frac{1}{10000}$ of an inch for instance, until the work piece has been machined to within the tolerances permitted.

It is another feature of this invention to permit the determination of the measurements successively closer to the measurement ultimately desired with but one setting of the calipers, this setting corresponding to the desired measurement.

Another object of the invention resides in the provision of locking means for the caliper adjusting screw, insuring the retention of the original setting of the calipers, corresponding to the ultimately desired measurement.

Other features and objects not specifically enumerated will appear from the following concise specification describing in detail the calipers embodying this invention and illustrated in the drawing in which:

Figure 1 is an elevational view of one preferred form of calipers provided with three scales of successively finer fractional subdivisions;

Figure 2 is a detail section taken along the line 2—2 of Figure 1; and

Figure 3 is a diagrammatic view of a caliper having an additional scale of still finer fractional subdivision.

Referring now to Figures 1 and 2 of the drawing, the caliper 1 comprises two legs 2 and 3, pivotally mounted upon a common pivot 4. A spring 5 tends at all times to spread the legs 2 and 3 apart. This spreading action of the spring 4 is counteracted by an adjusting thumb wheel 6 threaded over the free end of a screw shank 7 pivotally mounted at 8 within a recess 9 of the leg 3. The thumb wheel 6 engages in a substantially spherical recess 10 at the outside of the leg 2. A second thumb wheel 12 is threaded upon the screw shank 7 between the two legs 2 and 3 and comprises a suitable locking means for the adjusting wheel 6. The thumb wheel 12, when in locking position, bears against an arcuate shoulder 13 of the leg 2 affording a firm locking of the adjustment of the calipers to the desired measurement of a work piece in spite of rough handling by a machine operator.

The leg 2 ends in the fixed measuring point 14, while the leg 3 has pivotally mounted at its lower end at 15 a feeler arm 16, one end thereof constituting the measuring point 17, the other end extending upwardly and terminating in a finger piece 18 facilitating the swinging of the feeler arm 16 for inserting the calipers over a work piece to be measured. A spring 19 rigidly secured to the feeler arm 16, as at 21, extends upwardly therefrom within the recess 9 of the leg 3 and bears against the eyelet portion 20 of the screw 7. This spring 19 presses the measuring point 17 toward the adjacent measuring point 14, a shoulder 23 on the scale plate 24 limiting the movement of the arm 16 in one direction. The scale plate 24 is carried by the leg 3 and extends laterally thereof approximately within the plane of movement of the legs 2 and 3. This scale plate 24 is provided with one scale 25 having fractional subdivisions corresponding to the measurements between the measuring points 14 and 17 in multiples of $\frac{1}{64}$ of an inch. The scale 25 is arranged adjacent the lower edge of a window 26 in the plate 24 and immediately above the upper edge of the window 26 a scale 27 showing fractional subdivisions each corresponding to $\frac{1}{100}$ of an inch in measurement at the measuring points 14 and 17. A marker line 28 extending downwardly upon the upper extension 29 of the feeler arm 16 from the finger piece 18 and cooperates with the scales 25 and 27 to indicate measurements upon a work piece. A third scale 31 having still smaller fractional subdivisions, as for instance subdivisions corresponding to fractional measurements of $\frac{1}{1000}$ of an inch, is provided upon the scale plate 24 adjacent a window 32. An indicator arm 33 cooperates with the scale 31 and is pivotally mounted at 34 between the scale plate 24 and a rear plate 35 corresponding in shape to the plate 24 and, likewise, carried by the leg 3. The rear plate 35 is spaced from the plate 24 sufficiently to allow for free movement of the extension 29 and the indicator 33 therebetween. The indicator 33 is provided with an engagement point 38 bearing against a boss 39 provided at the extension 29 under the pressure of a light spring 41 mounted at 42. The relationship of the distance of the point 38 from the pivot point 34 and of the distance of the indicating point 43 of the indicator 33 from the pivot point 34 is properly chosen to move the indicator point 43 over ten subdivisions of the scale 31 for a movement of the line 28 from the zero line of the scale 27 to the next subdivision line indicating one $1/100$. It will be noted that the indicator arm 33 has but limited arcuate movement, the point 43 extending upwardly through the window striking the far end 44 of the window 32.

As shown and described in my copending application identified above, my improved caliper is provided with a stop means 45 comprising a plunger 46 and a spring 47 tending to push the plunger outwardly of the sleeve 48. A handle member 49 moving in a bayonet slot 50 is provided to render the stop means 45 inoperative at option. When in operative position, the plunger 46 engages the edges 52 of the plates 24 and 35 and will thus prevent the return of the arm 16 with extension 29 and of the indicator 33 to normal or zero position when the caliper is removed from the work piece measured. Thus the machine operator may determine with absolute certainty the accurate measurement of the work piece after removing the caliper from the work piece.

While the caliper shown is arranged for measuring outside dimensions, it is to be understood that all the features outlined apply equally well to inside calipers. By reversing the measuring points to face outwardly as indicated at 14' and 17' in dotted lines in Figure 1, an inside caliper may be obtained.

Referring now to Figure 3, the diagrammatic view shows another embodiment of my invention comprising a caliper 1' provided with the same scales 26, 27 and 31 as in the caliper of Figure 1. In addition to these scales, this caliper 1' is provided with an additional scale 60 of still smaller fractional subdivision corresponding, for instance, to measurements of $1/10000$ of an inch. An indicator 61 indicates the measurements upon the scale 60 and is operated in a manner similar to that of the arm 33 of Figure 1.

What is believed to be new and I wish to have protected by United States Letters Patent is pointed out in the appended claims.

I claim:

1. In a measuring instrument of the character described, the combination of a pair of legs pivoted at a common point, one leg being provided with a relatively fixed measuring point, the other leg carrying a scale plate with a plurality of scales of different fractional subdivisions and a feeler arm pivotally and resiliently mounted at the lower end of said other leg and provided with a measuring point at one end, the other end of said feeler arm comprising an indicator means cooperating with one set of scales of two different fractional subdivisions and adapted to actuate a second indicator cooperating with a scale of another fractional subdivision.

2. In a measuring instrument of the character described having a pair of legs pivoted at a common point, the combination of a feeler arm pivotally and resiliently mounted at the lower end of one leg and provided with a measuring point at one end thereof, the other end thereof comprising a finger piece for manually displacing said feeler arm with respect to the measuring point of the other leg, indicator means adjacent said other end of the feeler arm, said indicator means cooperating with one scale having fractional subdivisions of $1/64$ of an inch and with a second scale having fractional subdivisions of $1/100$ of an inch, and a second indicator means operated by said first indicator means and resiliently and pivotally mounted adjacent said finger piece, said second indicator means cooperating with a third scale having fractional subdivisions of $1/1000$ of an inch.

3. In a measuring instrument of the character described having a pair of legs pivoted at a common point, the combination of a feeler arm pivotally and resiliently mounted at the lower end of one leg and provided with a measuring point at one end thereof, the other end thereof comprising a finger piece for manually displacing said feeler arm with respect to the measuring point of the other leg, and indicator means adjacent said other end of the feeler arm giving measurement indications upon a set of two scales, means for actuating a plurality of further indicator means, said further indicator means giving measurement indications upon a plurality of correlated scales, the different scales indicating successively smaller fractional subdivisions of a unit of measure.

PETER STORM.